H. SCHMIDT.
COUPLING DEVICE.
APPLICATION FILED DEC. 28, 1911.
1,165,541.
Patented Dec. 28, 1915.
2 SHEETS—SHEET 1.
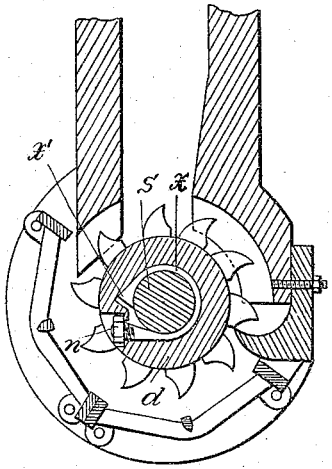
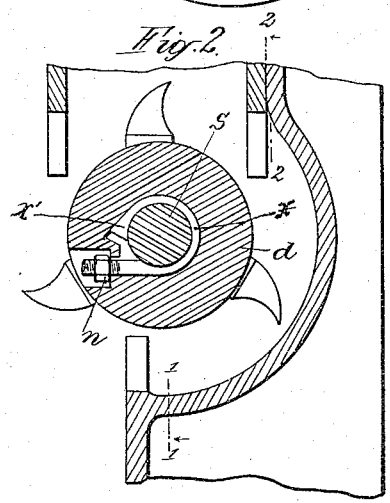
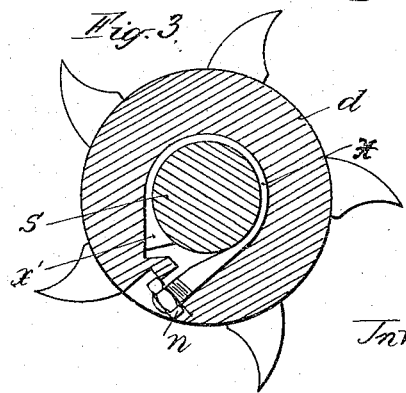

H. SCHMIDT.
COUPLING DEVICE.
APPLICATION FILED DEC. 28, 1911.

1,165,541.

Patented Dec. 28, 1915.
2 SHEETS—SHEET 2.

UNITED STATES PATENT OFFICE.

HANS SCHMIDT, OF SÖRUP, SCHLESWIG, GERMANY, ASSIGNOR TO CHRISTOPH WILHELM FERDINAND HANSEN, OF FLENSBURG, GERMANY.

COUPLING DEVICE.

1,165,541. Specification of Letters Patent. Patented Dec. 28, 1915.

Application filed December 23, 1911. Serial No. 668,374.

*To all whom it may concern:*

Be it known that I, HANS SCHMIDT, subject of the King of Prussia, residing at Sörup, Schleswig, Germany, have invented certain new and useful Improvements in Coupling Devices, of which the following is a specification.

This invention relates to machines for breaking up materials such as food cakes for animals, and has for its main object to improve the construction of machines of this type.

It is the object to provide means whereby the breaking roller is yieldingly connected to the drive shaft, to permit the roller to yield when the teeth are brought into contact with substance too hard for the teeth to cut or break, and the machine is in danger of being clogged or broken.

Figure 4:
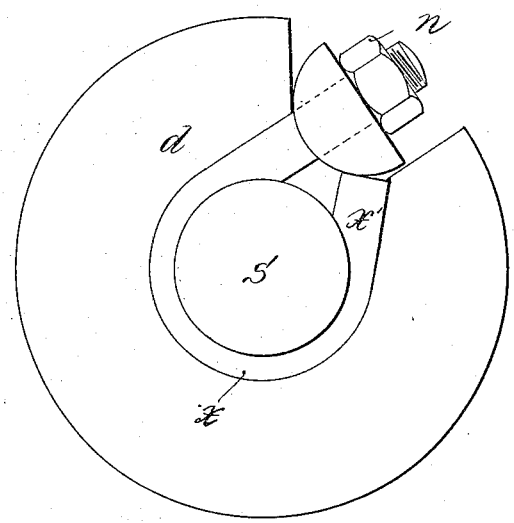

With these objects in view, and others as will hereinafter appear, the invention will be fully described with reference to the accompanying drawings, in which, Figure 1 is a vertical transverse section through the machine, showing the grinding roller and its connection to the shaft; Fig. 2 is a similar view in another type of machine; Fig. 3 is a transverse section through the shaft and roller; Fig. 4 is a transverse section showing a modified form of connection, and Figs. 5 and 6 are detail views of parts shown in Fig. 4.

A flexible steel band or strap $x$ is provided with a wedge-shaped head $x'$, and lies in a groove formed in the interior of the roller $d$, with the wedge-shaped head bearing between the roller and the shaft $s$, the portion which bears on the shaft being rounded and fitted thereto, and the head proper resting in a recess in the roller and being positioned to be pushed loose from the shaft by backward action of the roller. The opposite end of the strap $x$ is threaded and fitted with an adjusting nut $n$, said nut resting in a socket or recess in the roller $d$. In operation, the nut is adjusted to the point where the wedge is jammed between the shaft and roller tightly enough to cause the shaft to rotate the roller to break such material as the machine is treating at the time, but not hard enough to make the roller turn against the choking action of hard foreign substances. When the teeth of the roller strike some hard substance which acts as an obstacle to the normal operation of the machine, so that the roller is apt to become jammed or broken, a momentary increased strain exists on the wedge-part of the annular band. This strain acts first as an increase in friction between the wedge and the shaft, so that a momentary braking action results, whereby the shaft is slowed up. This action, however, as above stated, is only momentary, and the increased pressure expends itself principally in overcoming the friction between the band and shaft, since the backward thrust of the roller acting on the wedge-element, loosens its grip on the shaft and thus frees the roller from its fixed connection to the shaft. The momentary braking operation is ended by the releasing operation by which the frictional engagement of the roller and shaft is overcome. The fact that the wedge is fitted to the periphery of the shaft, but seats in a recess whose side is tangential to the periphery of the shaft causes the roller to bear back on the wedge, when the roller stops, and loosens the grip of the shaft on the wedge and consequently the roller.

Figure 5:
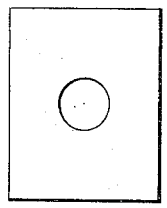
Figure 6:

The form shown in Figs. 4 to 6 is a modification of the device in the other figures, and shows a wedge $x$ which is fitted to the periphery of the shaft and whose outer face bears against a face of the roller which is tangential to the periphery of the shaft, and further, a button having a semi-spherical form, and seated by means of the nut $n$, bears between the farther face of the recess in the roller and the head of the wedge, so that when the roller is following the rotation of the shaft, the button causes the wedge to bind the roller to the shaft, but when the roller stops, this pressure is relieved, and the roller is in a position to slip on the shaft.

The operation of the device is evident from the foregoing description, and has been practically set out therein. The machine is adapted to break not only the food cake mentioned, but is capable of comminuting or cutting brittle and fibrous substances, and by reason of the flexible connection between the shaft and the roller, it is readily stopped when materials are encountered which the machine is not adjusted to handle.

Having described my invention, what I claim and desire to secure by Letters Patent is:—

1. A coupling comprising in combination with a shaft and a rotary member thereon, a strap surrounding said shaft and having one end projected through said rotary member and adjustably connected thereto, the opposite end of said strap, being provided with a wedge-shaped head, said head also projected into said rotary member and lying in a recess provided therefor, said wedge-shaped head being drawn into coupling relation with said rotary member and said shaft by the rotation of the latter.

2. A coupling comprising in combination with a shaft and a member to be rotated thereby, a strap surrounding said shaft and having one end extending tangentially from said shaft and through said member to be rotated, means securing said projecting end to said member to be rotated, whereby the latter will pull the strap tight on said shaft, the opposite end of said strap, being provided with a head, said head being seated in a recess therefor formed by the surface of said shaft and a tangential pocket in said member, said head being adapted to be wedged in said recess between the shaft and said member.

3. A coupling comprising in combination with a shaft and a member to be rotated therewith, said member having a tangential recess contiguous to the periphery of said shaft, a strap surrounding said shaft, said strap being provided with a wedged head seated in said recess so that the rotation of the shaft wedges said head into coupling relation between the shaft and the said member, an adjusting head on the opposite end of said strap, said opposite end projecting through said member in substantially tangential relation to said shaft and said adjusting head having a two-point bearing between said member and said wedged head.

In testimony whereof I affix my signature in presence of two witnesses.

HANS SCHMIDT.

Witnesses:
 JULIUS RÖPKE,
 MAX KALWA.

Copies of this patent may be obtained for five cents each, by addressing the "Commissioner of Patents, Washington, D. C."